(12) United States Patent
Fling et al.

(10) Patent No.: US 7,043,983 B2
(45) Date of Patent: May 16, 2006

(54) HORIZONTAL LIQUID LEVEL MEASURING DEVICE

(76) Inventors: William F. Fling, P.O. Box 265, Little River, CA (US) 95456; John J. Fling, P.O. Box 265, Little River, CA (US) 95456

( * ) Notice: Subject to any disclaimer, the term of this patent is extended or adjusted under 35 U.S.C. 154(b) by 89 days.

(21) Appl. No.: 10/737,349

(22) Filed: Dec. 15, 2003

(65) Prior Publication Data

US 2005/0126284 A1    Jun. 16, 2005

(51) Int. Cl.
 *G01F 23/36* (2006.01)
(52) U.S. Cl. ......................................................... 73/313
(58) Field of Classification Search ................... 73/313
 See application file for complete search history.

(56) References Cited

U.S. PATENT DOCUMENTS

| | | | |
|---|---|---|---|
| 3,709,038 A | * | 1/1973 | Werner ........................ 73/313 |
| 3,793,884 A | | 2/1974 | Fling et al. |
| 4,092,861 A | | 6/1978 | Fling |
| 4,147,060 A | | 4/1979 | Fling et al. |
| 4,154,103 A | | 5/1979 | Fling |
| 5,196,824 A | * | 3/1993 | Helm ....................... 340/450.3 |

* cited by examiner

*Primary Examiner*—Hezron Williams
*Assistant Examiner*—Katina Wilson
(74) *Attorney, Agent, or Firm*—Lynn & Lynn

(57) ABSTRACT

A system for actuating an indicator in response to a depth change in a liquid that is confined to a container comprises a housing, a float constrained to vertical movement in response to changes in liquid depth in the container and a drive rod arranged to move in response to vertical movement of the float. A flexible coupling is connected to the actuator and arranged to maintain the actuator in a vertical orientation in the liquid when the actuator and the housing are out of vertical alignment, and a coupler mechanism arranged to transfer movement of the actuator to the indicator.

12 Claims, 5 Drawing Sheets

HORIZONTAL LIQUID LEVEL MEASURING DEVICE

BACKGROUND OF THE INVENTION

The present invention relates generally to the measurement of the quantity of liquid in a container, vessel, barrel, drum, or the like. More particularly this invention relates to an improved liquid level measurement device having a float drive mechanism that includes a magnetic coupler arranged to activate an indicator pointer to indicate the liquid level in a container or the like.

DESCRIPTION OF PRIOR ART

There are many instances in which it is essential or desirable to be able to measure the level of liquid in a container, barrel, or the like, and in that manner determine the volume or quantity of liquid in the container. For example, numerous companies, business, shops, institutions and other organizations either transporting, storing or dispersing of liquid products, find it convenient to introduce chemicals, lubricants and fuels directly from shipping containers, i.e., drums, barrels, into their processes. This saves time and expense of having additional large bulk storage tanks and equipment to transfer the contents of the bulk storage tanks to the smaller containers. Drums are used throughout the world to transport, store, distribute, and dispense a variety of liquid products. For example, manufacturing firms use individual drums or an entire rack or rows of racks in their manufacturing processes. Material handling dealers and suppliers of chemical products package and distribute their liquid products in drums. In addition, farms, construction sites, schools, machine shops, printing firms, military, government, and numerous other organizations find the use of containers a useful way of handing their liquid products requirements.

A frequently used device for measuring the liquid contents of drums and or containers is a liquid level detector. There are a number of devices in the market place that serve this purpose. One of these devices is the standard sight gauge consisting of a metal pipe with a glass window to view of the level of liquid. The viewing glass has a gauge registered to the nearest gallon. In addition, the device is equipped with a T-connection threaded on one end to fit a standard ¾ inch threaded bunghole and to accommodate a faucet on the other end of the T-connection. The sight gauge devices suffer from a number of deficiencies that make them unsatisfactory for extended-life measuring purposes. For example, the device is not equipped with a pressure relief valve for drum venting purposes and must rely on a separate device to provide this capability. The glass view port is subject to fogging due to condensation and discolorization and lacks the convenience of a large dial for easy, at a glance reading. Also the external mounting design lends itself to damage through mishandling and breakage.

Another device in use in the measurement of drums, small tanks and containers is a self-contained unit with a magnet-equipped float that moves with the liquid level along the unit stem, inside the storage container. A liquid level readout is obtained by simply removing the protective cap at the top of the unit and lifting the calibrated indicator (within the unit) until magnetic interlock with the float is felt. The indicator is then lowered back inside the unit for storage and is protected by the screw cap when not in use. This unit suffers from a number of deficiencies, namely it is cumbersome to use, provides readouts in inches only, does not provide at-a-glance check of drum contents, and is not applicable to stack drum racks, and is restrictive in use in confined storage spaces were the drum must be moved to an open floor space to be used. This unit is not equipped with a built in pressure relief valve capability.

The wood dipstick is another method for measurement of container liquid levels but at best gives an approximate measurement of liquid levels. This approach is dependent upon the residual liquid wetline to indicate the liquid level in the container. The wet line is subjected to evaporation when exposed to air or to the elements, which distorts the accuracy of the measurement, and leads to approximate readings at best The gauge on the typical wood stick is not refined and therefore lacks accuracy and provides approximate measurements at best. The stamped painted gauge on the stick is subject to ware and fads in time. In addition, the wood construction of the stick leads to splintering and breakage over time.

Another device used to measure liquid levels within containers is a drum gauge that is confined to upright mounted drums. The device consists of an indicator with a plastic housing with an attached flexible rod, the top of which is affixed with a washer used as a pointer. The indicator is screwed into the drum bunghole for mounting to the drum. The indicator is inscribed with a scale calibrated in gallons, liters and inches. As float moves up or down with changing liquid levels the indicator rod with the attached washer pointer registers against the scale. As in the instance of the sight gauge device, the plastic indicator housing containing the imprinted scale is subject to the corrosive effects of fumes venting from the container into the indicator housing. In addition, the plastic housing is subject to fogging. These two conditions contribute to reduce visibility in viewing the readout of liquid levels and shorten the useful life of the device. In addition; the device tends not to deploy easily in a full drum condition because when the float and associated rod contact the liquid the unit extends in a horizontal direction and thus contacts the side of the drum prohibiting deployment. In a full drum, tank or container, the cap must be removed and an adjustment made prior to installation of a device for measuring the liquid level.

SUMMARY OF THE INVENTION

An object of the invention is to provide an improved liquid level measuring device for use in the side and end reading modes.

Another object of the invention is to provide improved performance, reliability, accuracy and diversity within competitive price structures and conventional manufacturing processes.

The liquid level measurement device according to the invention includes an indicator having a 360° rotational movement for mounting on a container providing a pendulous self-aligning visual reading related to the level of the liquid in the container. The rotational feature of the indicator accommodates the movement of the indicator rather than requiring changing the position of the container to view liquid level measurements. The liquid level measurement device has a frame section that is threadedly mounted in the container's bunghole. The indicator is then snapped-on or threaded on the housing and frame section completing the installation. The frame has a buoyant float adapted for floating on the surface of the liquid in the container.

In a preferred embodiment the liquid level measurement device has a drive rod formed as a 270° fractional turn helix that serves as a driver for an attached magnetic coupling, which together with a matching magnetic coupling contained in the indicator comprises a magnetic coupler. The magnetic coupler provides the capability of using a sealed environment to convey the level of liquid in a container by the use of magnetics, which eliminates the requirements for the conventional shaft, and bearing combination, which prevents a sealed environment.

The fractional turn helical driver is connected to a flexible coupling that is in turn connected to a rod arranged to rotate a first portion of the magnetic coupler. The magnetic coupler then transfers this rotation to the indicator dial. The flexible coupling provides the capability of using the invention to measure liquid depth in both horizontally and vertically oriented containers.

The frame section has two guide bars that engage the float and prevent the float from having a rotational motion instead of the desired linear motion as the float moves in an upward or downward direction on the fractional turn helical drive rod.

DETAILED DESCRIPTION OF THE INVENTION

Figure 1:
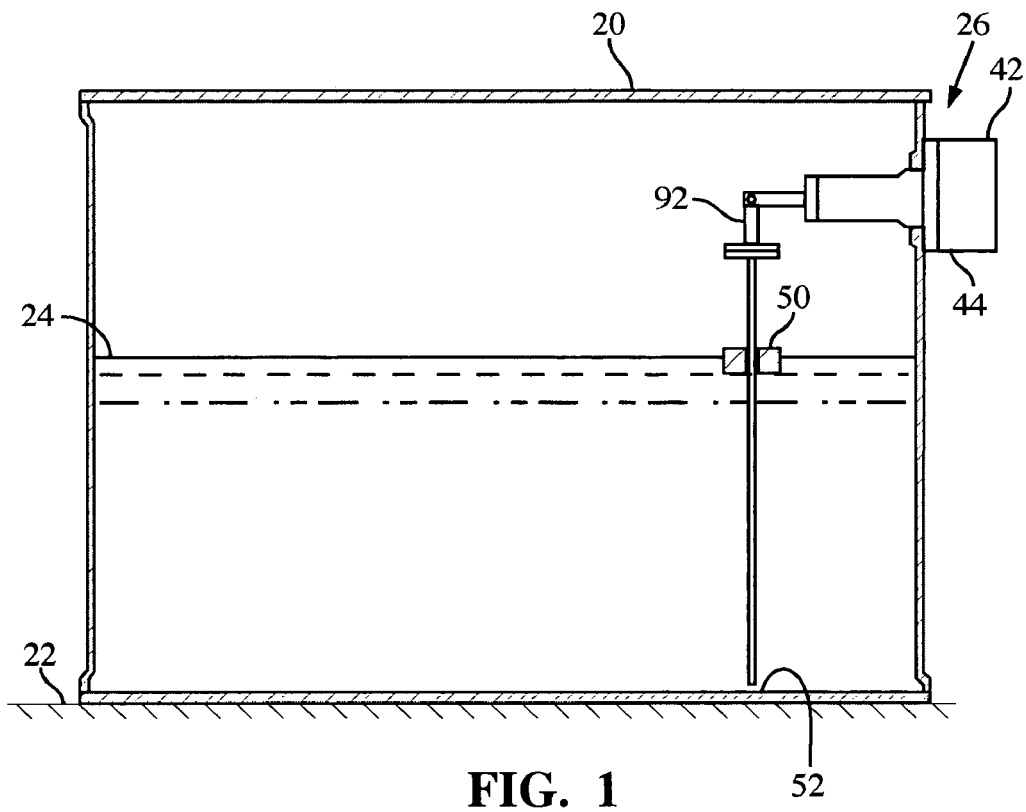
FIG. 1 is shows an embodiment of the present invention mounted for use on a horizontally oriented container.
Figure 2:
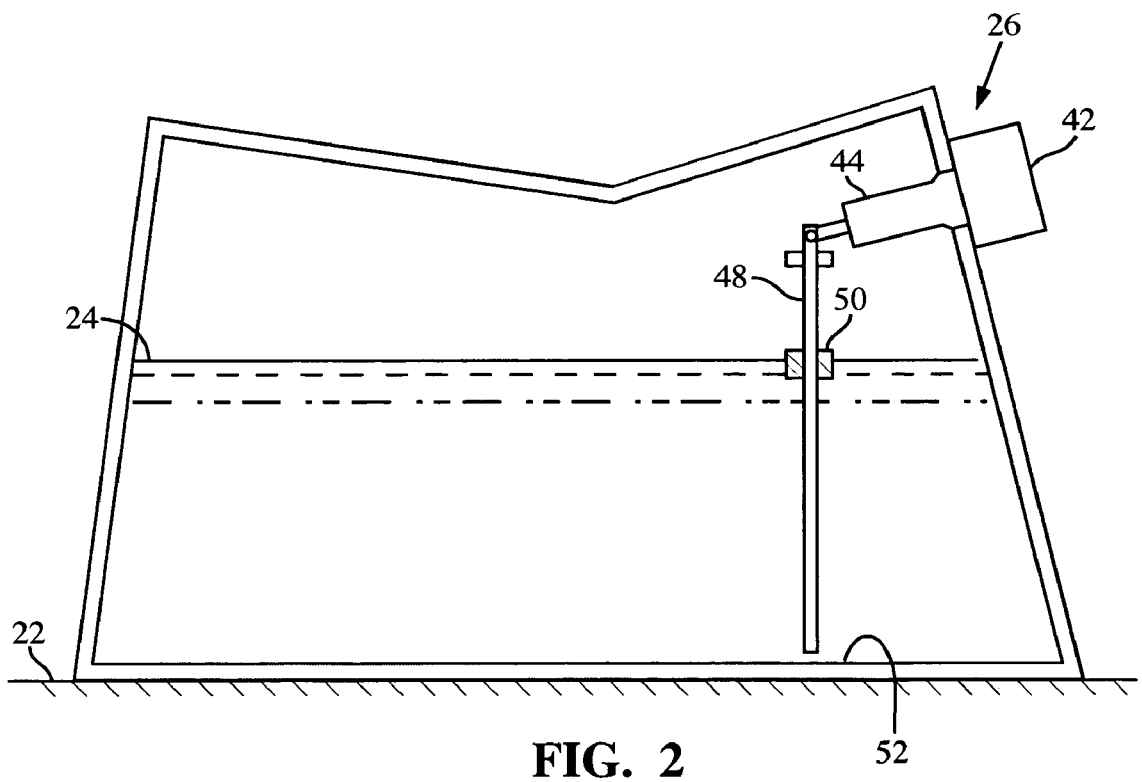
FIG. 2 shows the embodiment of FIG. 1 used with a horizontally oriented container that has been deformed.
Figure 3:
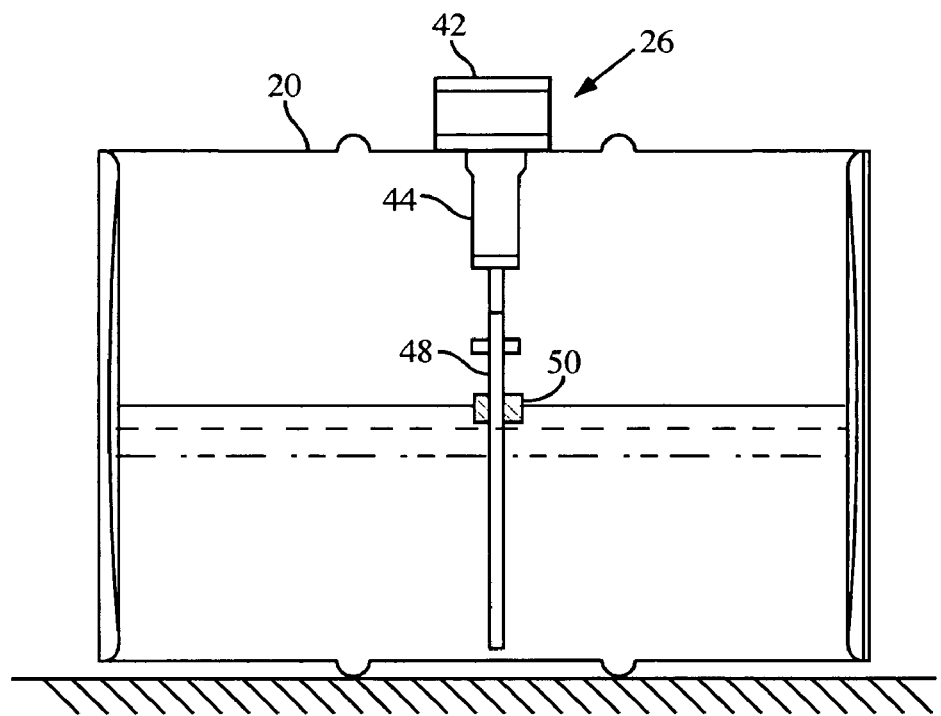
FIG. 3 shows the invention being used with a horizontally mounted container using the mid-container bunghole.
Figure 4:
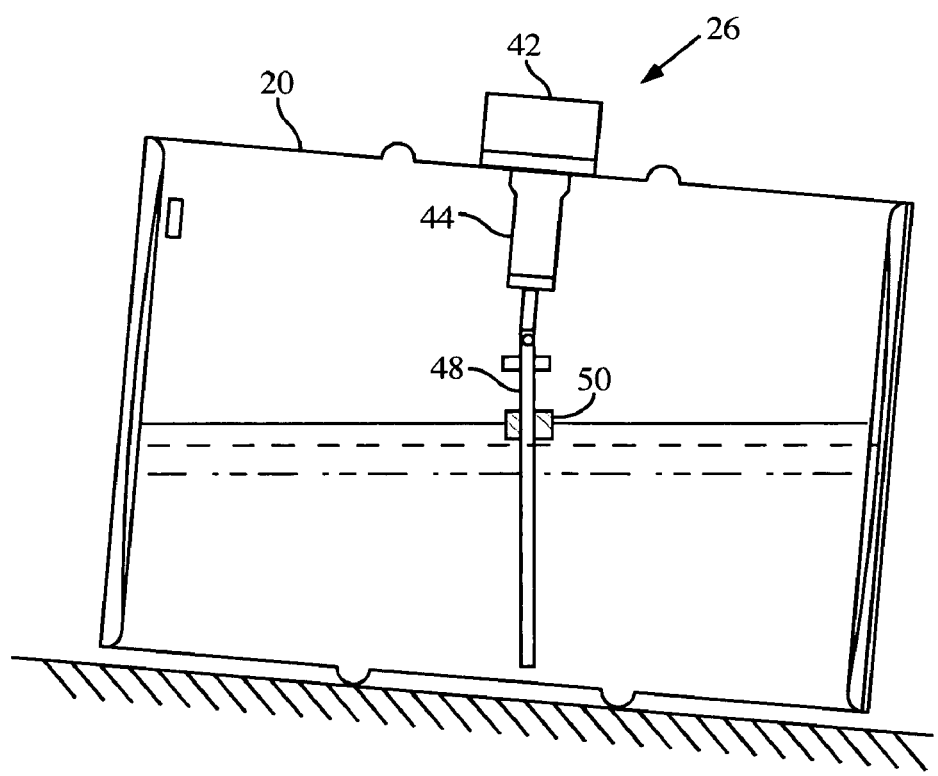
FIG. 4 shows the invention being used with a container resting on a surface that is not level.

Turning now to the drawings and particularly to FIG. 1, a container 20 is depicted for illustrative purposes as being located on a level surface 22 and partially filled with a liquid 24. A liquid level measurement device 26 according to the invention is mounted to the container 20. It is a primary purpose of the liquid level measurement device 26 to measure the depth of the liquid 24 from which (knowing the tank geometry) the volume of liquid 24 in the container 20 can be determined.

Figure 5:
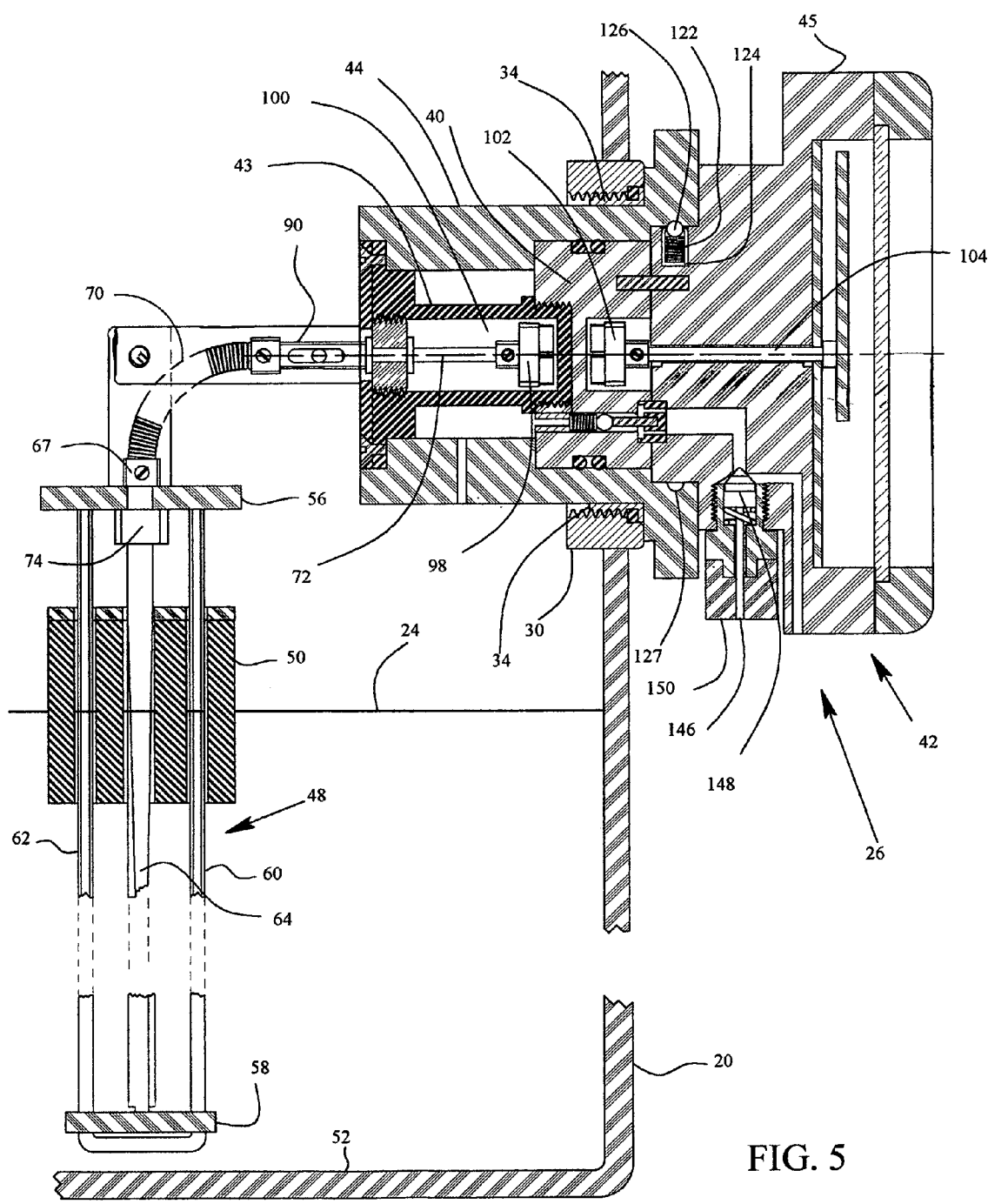
FIG. 5 is a partial cross sectional view showing structural features of the invention being used with a horizontal container
Figure 6:
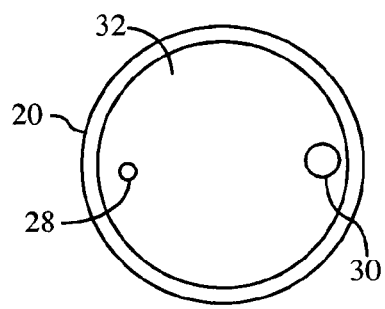
FIG. 6 is an end view of a conventional container used to hold liquids.
Figure 7:
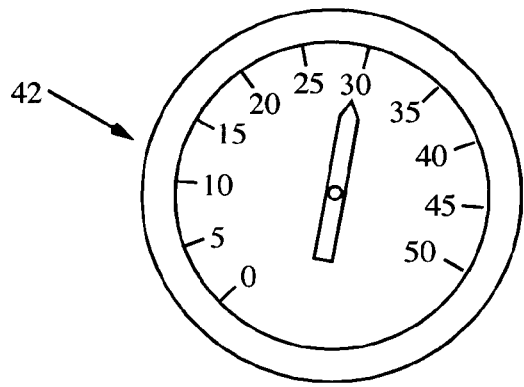
FIG. 7 is an end view of an indicator dial that may be used with the present invention.

Referring to FIGS. 1 and 6, the container 20 typically has openings 28 and 30 provided in a lid 32 for adding or dispensing liquids. The openings 28 and 30 typically are threaded and have diameters of 0.75 inch and 2 inches respectively. As shown in FIG. 5, the liquid level measurement device 26 has a threaded coupling 34 that may be used to mount the liquid level measurement device 26 in the opening 30.

The liquid level measurement device 26 according to the invention may be advantageously employed for measuring liquids of great variety in tanks. It is considered within the sprit of this invention to make the measurement device small-sized for uses such as measuring liquid depth in drums, barrels, jumbo, rectangular shop tanks, oval shaped tanks for shop, home heating generators and numerous other applications. Therefore, for the convenience of description of the invention, it is described in connection with measuring the depth (and thus amount) of liquids stored and dispensed in such containers.

The liquid level measurement device 26 includes an indicator 42, a housing 44, an upper frame section 45 extending from the housing 44, a lower frame section 48 that extends into the liquid 24 and a float 50 that moves along the lower frame section 48 in response to changes in the liquid level. The lower frame section 48 is an elongated structure having an overall length such that it extends to a location near the lowermost portion 52 of the container 20. Differing containers have varying lengths, and to conform to this requirement the frame section along with the fractional turn helical drive rod and the guide bars can be modified to conform to differing dimensions of the containers involved.

The lower frame 48 includes an upper plate 56 and a baseplate 58 with a pair of guide bars 60 and 62 arranged to extend between them. The fractional turn helical drive rod 64 has a bottom projection 66 that extends into a recess 68 in the baseplate 58. The helical drive rod has an upper end 67 that is connected to a flexible shaft 70 that is in turn connected to a rod 72 through variable length coupler 90. The fractional turn helical drive rod 64 is suspended between the guide bars 60 and 62. The lower ends of the guide bars 60 and 62 may be fastened to the base plate 58. The upper ends of the guide bars 60 and 62 are connected to the upper plate 56. The fractional turn helical drive rod 64 is suspended centrally between the guide bars 60 and 62 with the upper end of the fractional turn helical drive rod 64 extending through a passage 74 in the upper plate 56.

Figure 8:
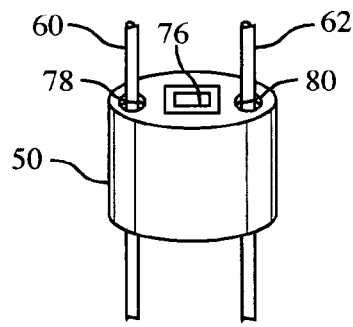
FIG. 8 is a perspective view of a float and guide and guide bar arrangement that may be included in the present invention.

Referring to FIGS. 5 and 8, the float 50 preferably is formed as a cylinder and preferably has a central passage 76 extending therethrough. The passage 76 preferably extends through the center of the float 50 and has a rectangular cross section. A pair of circular passages 78 and 80 is formed near opposite side portions of the float 50. The float 50 is mounted in the frame so that the guide bars 60 and 62 extend through the passages 78 and 80 and the fractional turn helical drive rod 64 extends through the passage 76. The guide bars 60 and 62 are parallel so that the float 50 is constrained to linear movement up and down as the liquid level changes in the container. The fractional turn helical drive rod 64 can be rotated about its vertical axis. As the height of the float 50 changes, the rectangular cross section fractional turn helical drive rod 64 engages the surfaces of the rectangular central passage, which produces a torque on the fractional turn helical drive rod 64. The liquid level measurement device 26 is calibrated so that the angular orientation of the fractional turn helical drive rod 64 as it rotates about the vertical axis indicates the liquid level in the container 20.

Figure 9:
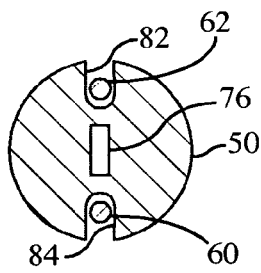
FIG. 9 is a cross sectional view showing a float and a pair of guide rods that may be used with the embodiment of the invention shown in FIG. 4.
Figure 10:
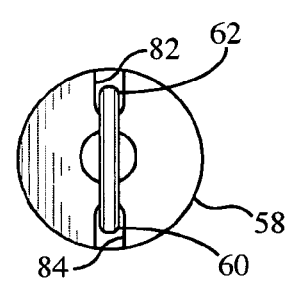
FIG. 10 is a bottom plan view showing guide rods and an base plate that may be included in the present invention.
Figure 11:
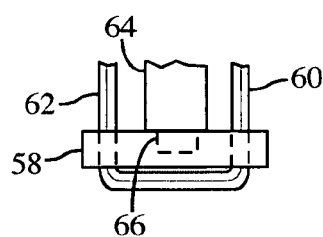
FIG. 11 is a side elevation view showing a base plate and bottom end portions of the guide rods of FIG. 9.

Referring to FIGS. 9–11, instead of having cylindrical passages 78 and 80, the float 50 may include a pair of slots 82 and 84. The slots 82 and 84 extend the full length of the cylindrical float 50 and are arranged to be diametrically opposite one another. The guide rods 60 and 62 fit inside the slots 82 and 84 so that the float 50 is constrained to vertical movement along the guide rods. The lower ends of the guide rods 60 and 62 may be connected together below the base plate 58 as shown in FIGS. 10 and 11.

As the device 26 is inserted and secured to the container 20 by threading into the selected container hole, the liquid level measurement device 26, as a two axis pendulous system, self aligns seeking the local vertical to adjust for any small angle in any two-plane container orientation. As the lower frame section 48 is inserted into the container 20, the float 50 tends to seek the level of the liquid 24 contained therein.

Figure 12:
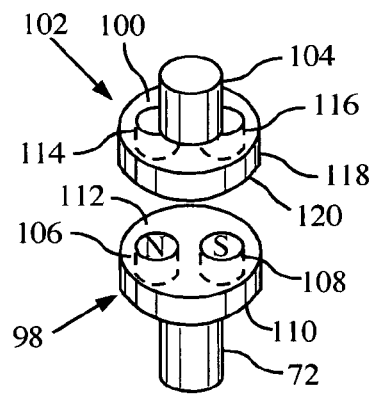
FIG. 12 is a perspective view showing a magnetic coupler that may be included in the present invention.

As shown in FIGS. 5 and 12, the rod 72 is connected to a first magnetic assembly 98 to support it in a cavity 100 in the housing 43. A second magnetic assembly 102 is mounted in the cavity 100 by a rod 104 that is rotatably mounted in the housing 45. As shown in FIG. 12, the first magnetic assembly 98 preferably comprises a pair of magnets 106 and 108 mounted in a disk 110 with opposite poles being adjacent an end 112. The second magnetic assembly 102 preferably comprises a pair of magnets 114 and 116 mounted in a disk 118 with opposite poles being adjacent an end 120. The magnetic assemblies 98 and 102 are arranged so that magnets of opposite polarity face one another. Because the magnetic poles of opposite polarity attract one another, they automatically align and remain in alignment as the helical drive rod 64 and the rod 72 rotate in response to changes in the liquid level.

The magnet assemblies 98 and 102 are arranged so that they are attracted to one another such that rotation of the first magnet assembly 98 causes rotation of the second magnet assembly 102.

The employment of the magnetic coupler approach makes possible another embodiment of the present invention. As shown in FIG. 5, the indicator 42 is arranged to be snap-fit on the housing 44. A spring 122 is mounted in a cavity 124 in the housing 45. A plunger 126 is fastened to the spring 122. The housing 44 includes a groove 127 arranged to receive the plunger when sufficient force is used to urge the indicator 42 toward the housing 44. The snap-fit mounting arrangement allows the indicator 42 along with insert 40 and housing 45 to rotate 360° to seek the local vertical. Locating pin 130 secures indicator 42 to insert 40. The indicator 42 can be easily removed from one container and attached to another. This embodiment of the invention permits multiple measurements of similar configured containers with a single indicator in addition to protecting the indicator from damage through miss handling and damage from material handling equipment. In the event that the container is positioned in a protective cabinet or the like, the indicator 42 can be removed for clearance purposes.

When the indicator 42 is removed, from the housing 44, the first magnetic 98 assembly remains in the position it was in while the indicator was attached if no liquid is removed from the container 20. The angular position of the first magnetic assembly 98 is a function only of the liquid level. When the indicator 42 is reattached to the housing 44, the second magnetic assembly returns to its previous angular position to indicate the liquid level.

In addition, this use of a magnetic coupler provides a sealed environment between the contents of the container and the outer environment and eliminates the need for conventional shafts and prevents the associated leakage of fumes and liquid that can contaminate instrument components and the environment. The magnetic coupler feature also provides for the means for the snap on snap off feature of the indicator that permits the removal of the indicator from the device with out the need to remove the entire device from the container or the like. This feature also accommodates the multiple readings of numerous containers with a single indicator and hence avoiding contamination of liquid products. The sealed containment feature makes it possible to ship containers with internally mounted devices less the indicator. Another feature of the device is the use of the flexible coupling 70 to accommodate the free axial movement of the frame section 48 of the device and assure a continual alignment with the vertical.

Figure 13:
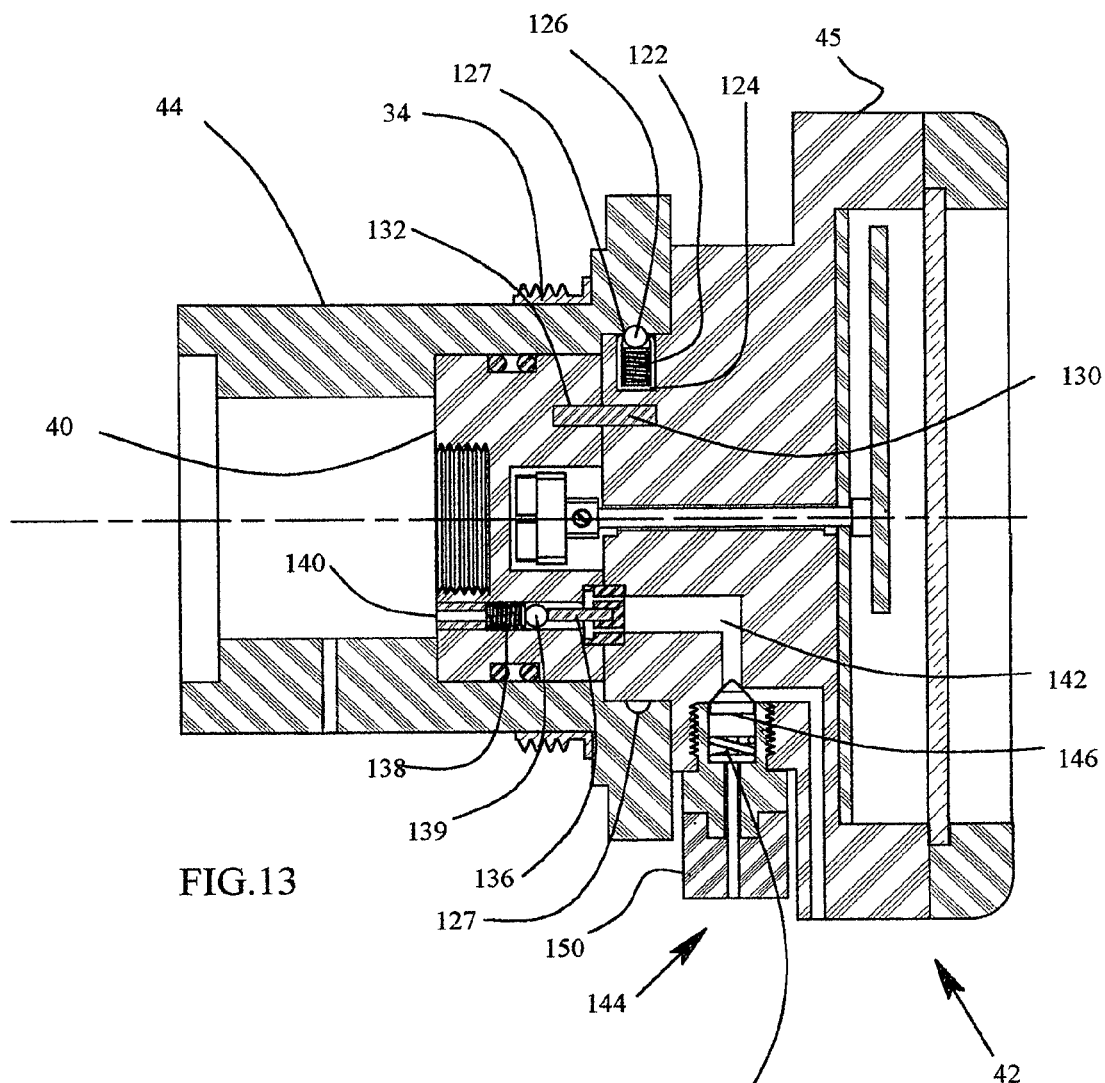
FIG. 13 illustrates structural features of a venting system including the "snap-fit" capability of the indicator that may be included in the embodiment of the invention shown in FIG. 5.
Figure 14:
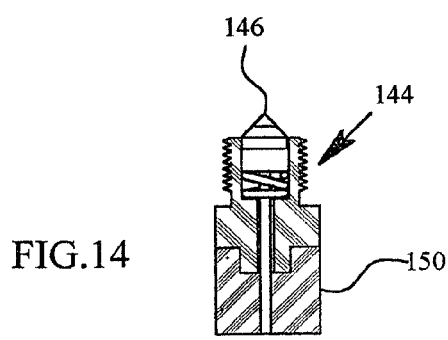
FIG. 14 is a cross sectional view illustrating a pressure relief valve in a closed position.
Figure 15:
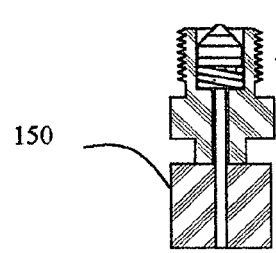
FIG. 15 is a cross sectional view illustrating a pressure relief valve in an open position.

Referring to FIGS. 5 and 13, the invention includes a pressure relief system 144 for venting to relieve pressure caused by heating and to prevent formation of a partial vacuum when the liquid cools and when liquid is drained from the container 20. When the indicator assembly 42 is attached to the housing 44, an indicator guide pin 130 aligns with a guide pin receptor hole 132 in the insert 40. As best shown in FIG. 13, in the automatic venting mode a plunger pin 136 compresses a spring 138 permitting ball 139 to open a vent hole 140 in the insert 40. The venting action passes through a vent passage 142 to a pressure release assembly 144 that includes a piston 146, a spring 148 and a cap 150. As the venting pressure impacts the piston 146, the spring 148 contracts to permit the piston 146 to assume an open position, which relieves the pressure in the container 20. As shown in FIGS. 14 and 15, the pressure relief system 144 may be manually opened by pulling outward on the cap 150 and then turning it to lock it in an open position.

Although the present invention described in connection with a preferred embodiment it is to be understood that modifications within the scope of the invention may occur to those skilled in the appertaining art.

What is claimed is:

1. A system for actuating an indicator in response to a depth change in a liquid that is confined to a container, comprising:
    a housing;
    a flexible coupling having a first end and a second end, the first end being connected to the housing, the flexible coupling comprises a flexible shaft having a variable shaft length compensator;
    a lower assembly connected to the second end of the flexible coupling, the lower assembly including a float constrained to vertical movement in response to changes in liquid depth in the container and a drive rod arranged to move in response to vertical movement of the float, the flexible coupling being arranged to maintain the actuator in a vertical orientation in the liquid when the actuator and the housing are out of vertical alignment;
    a pair of parallel rods connected to the housing and arranged to be inserted into the liquid;
    the float being slidably mounted to the rods such that the float is constrained to linear movement lengthwise along the rods; and
    a coupler mechanism arranged to transfer movement of the actuator to the indicator.

2. The system of claim 1 wherein the float includes a first passage and a second passage extending therethrough and arranged in corresponding relationship to the pair of rods such that a first rod extends through the first passage and a second rod extends through the second passage, the passages and rods being arranged to constrain the float to linear movement along the rods.

3. The system of claim 2, further comprising a third passage extending through the float, the drive rod being arranged to extend through the third passage, the drive rod and the float being arranged so that linear movement of the float along the rods causes rotational movement of the drive rod.

4. The system of claim 3 wherein the third passage has a rectangular horizontal cross section and the drive rod is formed as an elongate rod having a rectangular horizontal cross section, the elongate rod being formed as a helix that rotates about its longitudinal axis as the float moves vertically along the rods.

5. The system of claim 1 further comprising a rod connected between the flexible coupling and the coupler mechanism.

6. The system of claim 1 wherein the coupler mechanism includes a magnetic coupler arranged to couple rotational movement of the drive rod to the indicator.

7. The system of claim 2 wherein the coupler mechanism comprises:
   a first rod connected to the drive rod;
   a first disk connected to the first rod;
   a first pair of magnets mounted in the first disk;
   a second rod connected to the indicator;
   a second disk connected to the second rod
   a second pair of magnets mounted in the second disk, the first and second pair of magnets being arranged to be in facing relationship so that poles of opposite polarity are in longitudinal alignment.

8. The system of claim 7 wherein the first disk is mounted inside the housing and the second disk is mounted inside the indicator assembly with the indicator assembly being arranged to be removable from the housing while the container remains sealed by the housing mounted in the container opening.

9. The system of claim 8 wherein the housing includes a vent passage into the container and the indicator assembly includes apparatus for opening the vent passage when the indicator assembly is mounted on the housing.

10. The system of claim 1 wherein the coupler mechanism includes a magnetic coupler arranged to couple rotational movement of the drive rod to the indicator.

11. The system of claim 1 wherein the float and the drive rod are arranged such that vertical movement of the float produces rotational movement of the actuator.

12. A system for actuating an indicator in response to a depth change in a liquid that is confined to a container, comprising:
   a housing;
   a flexible coupling having a first end and a second end, the first end being connected to the housing, the flexible coupling comprises a flexible shaft having a variable shaft length compensator;
   a lower assembly connected to the second end of the flexible coupling, the lower assembly including a float constrained to vertical movement in response to changes in liquid depth in the container and a drive rod arranged to move in response to vertical movement of the float, the flexible coupling being arranged to maintain the actuator in a vertical orientation in the liquid when the actuator and the housing are out of vertical alignment; and
   a coupler mechanism arranged to transfer movement of the actuator to the indicator.

* * * * *